US005378525A

United States Patent [19]

Yamamoto et al.

[11] Patent Number: 5,378,525

[45] Date of Patent: Jan. 3, 1995

[54] CROWNED RESILIENT ROLL WITH COATING LAYER AND METHOD OF PRODUCING THE SAME

[75] Inventors: Takafumi Yamamoto, Kasugai; Masaaki Inubushi, Inuyama; Sumio Oinuma, Tajimi; Saburou Hayashi; Shigeru Nishijima, both of Kasugai; Masaharu Ishikawa, Komaki, all of Japan

[73] Assignee: Tokai Rubber Industries, Ltd., Japan

[21] Appl. No.: 88,524

[22] Filed: Jul. 9, 1993

[30] Foreign Application Priority Data

Jul. 23, 1992 [JP] Japan .................................. 4-217262
Jul. 23, 1992 [JP] Japan .................................. 4-217263

[51] Int. Cl.[6] .............................................. B32B 23/02

[52] U.S. Cl. .................................... 428/192; 428/34.1; 428/194; 428/475.5; 428/500

[58] Field of Search .................. 118/249, 114; 346/74; 428/192, 34.1, 194, 475.5, 500; 430/99; 355/290

[56] References Cited

U.S. PATENT DOCUMENTS

| | | | |
|---|---|---|---|
| 3,702,482 | 11/1972 | Dolcimascolo et al. | 346/74 |
| 3,901,186 | 8/1975 | Hoffman et al. | 118/637 |
| 4,949,132 | 8/1990 | Chimoto | 355/290 |
| 4,989,044 | 6/1991 | Nishimura et al. | 355/251 |
| 5,195,228 | 3/1993 | Fukunaga et al. | 29/130 |
| 5,209,997 | 5/1993 | Fromm et al. | 430/99 |
| 5,246,497 | 9/1993 | Rantanen | 118/249 |
| 5,319,430 | 6/1994 | DeBolt et al. | 355/290 |

*Primary Examiner*—Patrick J. Ryan
*Assistant Examiner*—William A. Krynski
*Attorney, Agent, or Firm*—Parkhurst, Wendel & Rossi

[57] ABSTRACT

A crowned resilient roll whose diameter is continuously increased from axially opposite ends of the roll toward an axially middle point thereof is disclosed. The resilient roll includes a columnar roll body formed of a resilient material, and a coating layer formed on an outer circumferential surface of the roll body. The thickness of the coating layer is varied in an axial direction of the roll body, such that the coating layer has the largest thickness at an axially middle point of the roll body, and such that the thickness is gradually reduced from the middle point toward axially opposite ends of the roll body. Also disclosed is a method of making such a crowned resilient roll having a coating layer of varying thickness.

12 Claims, 4 Drawing Sheets

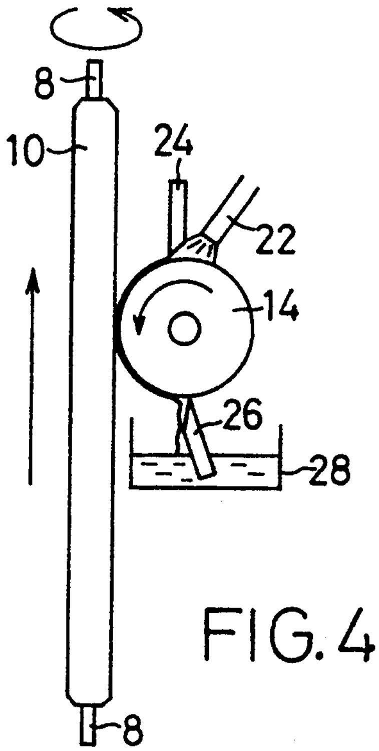
FIG. 4
FIG. 5
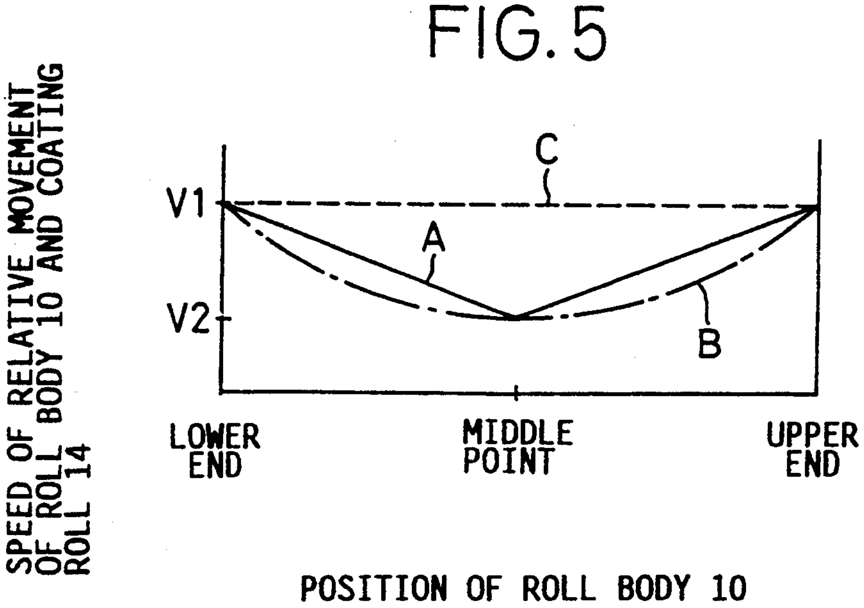

CROWNED RESILIENT ROLL WITH COATING LAYER AND METHOD OF PRODUCING THE SAME

BACKGROUND OF THE INVENTION

1. Field of the Invention

The present invention relates to a resilient roll having a resilient cylindrical body formed of a rubber material, for example, and more particularly to a crowned resilient roll whose diameter continuously increases from its axially opposite ends toward its axially middle point. The present invention is also concerned with a method of producing such a crowned resilient roll.

2. Discussion of the Prior Art

In electrophotographic copying machines, printers or the like, there have been used various kinds of rolls which include: a charging roll for electrostatically charging a surface of a photoconductive drum; an image developing roll for developing an electrostatic latent image formed on the drum surface into a visible toner image; an image transfer roll for transferring the toner image onto a copy sheet; and an image fixing roll for fixing the toner image on the copy sheet. Each of these rolls has a resilient cylindrical body, through which a metallic center shaft extends so as to serve as a rotation axis of the roll. The roll is usually biased at axially opposite ends of the metallic shaft, against a mating roll such as a photoconductive drum, under a biasing force of springs or the like, so that the two rolls are rotated together, with the outer circumferential surfaces of the rolls being in contact with each other.

However, the resilient roll of the above type may be bent due to the biasing forces applied to its axially opposite ends when the roll is installed in position, or the roll per se may be slightly curved or have recesses in its surface. In such cases, a clearance is likely to appear between an axial middle portion of the roll and the mating photoconductive drum, for instance, resulting in poor or reduced rolling contact therebetween. If such a clearance exists between an electrostatically charging roll and a photoconductive drum, for example, an image produced may have defects due to poor charging, when the roll and drum are operated in the severe environment of low temperature and low humidity. To avoid this, the clearance or gap between the roll and drum needs to be controlled to be about 20 $\mu$m or smaller Even with a small clearance (of 20 $\mu$m or smaller) between the charging roll and the photoconductive drum, poor charging may still occur due to an electrically insulating toner remaining on the drum. Namely, the remaining toner gradually accumulates on the drum surface during use, and forms insulating layers on local portions of the charging roll, which result in the poor charging. This may be avoided by provision of a cleaning member for the charging roll. In this case, however, the surface of the roll undesirably wears off due to sliding contact between the cleaning member and the charging roll. Accordingly, it is desirable to eliminate or zero the clearance between the charging roll and the photoconductive drum.

To achieve a good contact between the resilient roll and photoconductive drum, therefore, there has been proposed to use a crowned roll as shown in FIG. 7, which has a roll crown of several tens of microns. That is, the resilient roll is shaped such that the diameter of the axially middle portion of the roll is slightly larger (by several tens of microns) than those of its axially opposite end portions. In other words, the resilient roll is tapered from its axially middle point toward its axially opposite ends.

The resilient roll of this type is conventionally produced in the following manner. Initially, a suitable resilient material is vulcanized in a metal mold having a cylindrical cavity, with a metallic shaft 2 disposed at the center of the mold cavity, whereby a columnar resilient roll body 4 is formed on the shaft 2. Then, the surface of the roll body 4 is ground by a grinding machine, so that the roll body 4 has a crowned shape. For producing a charging roll, an electrically conductive resilient material is molded into the roll body 4, which is then grounded into a crowned shape. Then, the crowned roll body 4 is provided at its outer circumferential surface with a coating layer 6 as a resistance adjusting layer, which is formed of a semi-conductive resilient material. Further, a protective layer may be formed as needed on the surface of the coating layer 6. To form the coating layer 6, the surface of the roll body 4 is first cleaned, and is then evenly coated with the semi-conductive resilient material by a known dipping or roll-coating technique, such that the coating layer 6 has a constant thickness of several tens to hundreds of microns over the entire axial length of the roll.

To assure a good contact of the resilient roll of the above type with a photoconductive drum, for example, the roll body 4 is formed of a resilient material having a considerably low hardness (Hs: about 20°–25°). In this case, the ground roll surface tends to be rough, with minute pits and protrusions formed thereon. Namely, it is extremely difficult to grind the resilient roll of this type to provide a sufficiently smooth surface. Even after coating the roll body 4, the roll surface still has such minute pits and protrusions. Thus, the conventional resilient rolls produced in the above manner have a poor surface condition in which the minute pits are formed in the local areas of the roll surface. For practical use, these resilient rolls must be classified into different grades, depending upon the depth of the pits or the degree of the surface roughness.

During the grinding operation for the conventional crowned resilient roll, chips or particulates produced by the grinding are likely to stick to or accumulate on the roll surface since the low-hardness resilient body contains a comparatively large amount of softener. If these chips are not completely removed, the remaining chips form protrusions or other abnormality on local portions of the roll surface, which may possibly affect the performance of the resilient roll. It is therefore necessary to clean the roll surface after the grinding operation. Further, the roll body 4, which is formed of a low-hardness resilient material, must be ground at a low rate, resulting in an increased grinding time and reduced production efficiency.

Alternatively, the crowned roll may be produced in one step by using a metal mold with a crowned cavity having the same shape as the final product, and forming the roll body 4 in the mold by vulcanization. In this case, however, the metal mold must be split into two parts, inevitably causing burrs or flash generated at a joint of the two parts. This eventually necessitates a grinding process for the roll body obtained, leading to the same problems as described above.

SUMMARY OF THE INVENTION

It is therefore a first object of the present invention to provide a crowned resilient roll having a sufficiently high degree of surface smoothness, which can be readily produced with improved efficiency, without requiring surface grinding and cleaning processes.

It is a second object of the invention to provide a method of producing such a crowned resilient roll as described above.

The first object may be attained according to a first aspect of the present invention, which provides a crowned resilient roll whose diameter is continuously increased from axially opposite ends of the roll toward an axially middle point thereof, comprising: a columnar roll body formed of a resilient material; and a coating layer formed on an outer circumferential surface of the roll body, the coating layer having a thickness which is varied in an axial direction of the roll body, such that the coating layer has the largest thickness at an axially middle point of the roll body, and such that the thickness is gradually reduced from the axially middle point toward axially opposite ends of the roll body.

In the crowned resilient roll constructed according to the present invention, the coating layer is formed integrally on the outer circumferential surface of the columnar roll body, such that the thickness of the coating layer is gradually reduced from the axially middle point of the roll body toward its axially opposite ends. In operation, therefore, the thus crowned resilient roll is held in effectively improved contact with a photoconductive drum, for example. The present crowned roll, when used as a charging roll, does not suffer from poor charging, and does not require a cleaning member for removing the remaining toner from the charging roll, thereby avoiding wear of the roll surface due to its sliding contact with the cleaning member. This leads to effectively improved durability of the charging roll.

The second object may be attained according to a second aspect of the present invention, which provides a method of producing a crowned resilient roll whose diameter is continuously increased from axially opposite ends of the roll toward an axially middle point thereof, comprising the steps of: (a) arranging a columnar resilient roll body and a columnar coating roll, such that an axis of the roll body extends in a vertical direction while an axis of the coating roll extends in a horizontal direction, and such that the coating roll is in contact with an outer circumferential surface of the roll body; (b) rotating the roll body and the coating roll about respective axes thereof; (c) applying a coating liquid to the coating roll, so that the outer circumferential surface of the roll body is coated with the coating liquid; and (d) moving the coating roll and the roll body relative to each other, at a speed which is continuously reduced as a point of contact between the coating roll and the roll body is shifted from one of axially opposite ends of the roll body to an axially middle point thereof, and which is continuously increased as the point of contact is shifted from the axially middle point of the roll body to the other axial end thereof, so as to form a coating layer on the outer circumferential surface of the roll body, such that the coating layer has a varying thickness which is at its maximum at the axially middle point of the roll body, and which is gradually reduced from the axially middle point toward the axially opposite ends of the roll body.

In the above-described method of producing a crowned resilient roll, the crowned shape of the roll is achieved by varying the thickness of the coating layer as formed on the outer circumferential surface of the roll body, rather than by the conventional grinding process applied to the formed roll body. The thickness of the coating layer is varied by continuously changing the speed of upward or downward movement of the coating roll and the roll body, such that the speed is relatively high at axially opposite end portions of the roll body, and is relatively slow at an axially middle portion of the body.

Since the present crowned resilient roll can be produced according to the present method without requiring the conventional grinding step, the processing time can be significantly reduced with a result of increased production efficiency, permitting a large number of rolls to be produced at a reduced cost. Further, the elimination of the grinding step solves the problems of deterioration of the surface condition due to grinding, sticking of grinding chips to the roll surface and others. Consequently, the present crowned roll is provided with a sufficiently smooth surface, which is achieved by forming the coating layer on a smooth surface of the roll body. The present resilient roll also ensures an excellent performance in operation, without cleaning of the roll surface. Further, the conventionally required classification of the individual rolls based on their surface conditions is eliminated because of the improved consistency in the surface smoothness of the rolls according to the present invention.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 4 is a schematic view showing an arrangement of a coating liquid supply device of the coating apparatus of FIG. 3;

FIG. 5 is a graph showing patterns of variation in the coating speed in the coating apparatus of FIG. 3;

DETAILED DESCRIPTION OF THE PREFERRED EMBODIMENT

Figure 1:
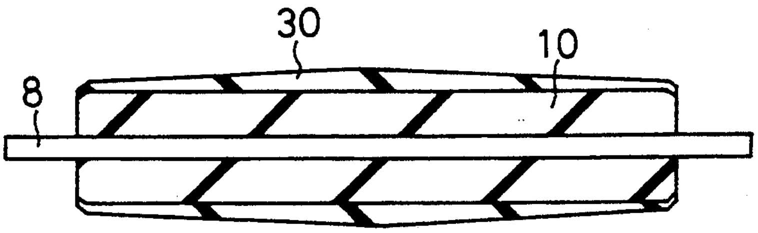
FIG. 1 is an axial cross sectional view showing one embodiment of a crowned resilient roll of the present invention.
Figure 2:
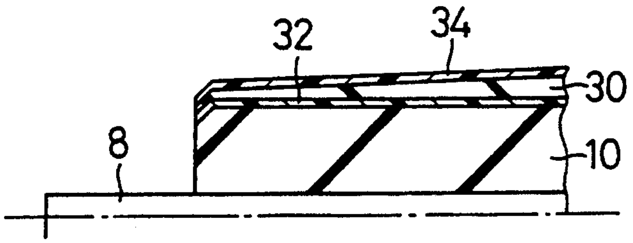
FIG. 2 is a fragmentary cross sectional view showing in enlargement a part of the resilient roll of FIG. 1.

Referring first to FIGS. 1 and 2 showing one embodiment of a crowned resilient roll of the present invention, reference numeral 10 denotes a columnar resilient roll body formed of a resilient or elastic material. A coating layer 30 is formed on the outer circumferential surface of the roll body 10 such that the coating layer 30 has the largest thickness at an axially middle point of the roll body 10, and the thickness of the layer 30 is gradually reduced toward axially opposite ends of the body 10. Thus, the resilient roll as a whole has a crowned shape, namely, is tapered from the middle point thereof in the opposite axial directions.

The roll body 10 is formed into a cylindrical shape by using a metal mold having a cylindrical cavity as disclosed in JP-A-2-258219, so that the body 10 has a smooth outer circumferential surface. More specifically, an unvulcanized material such as rubber is injected under pressure into the cylindrical mold cavity, with a metallic center shaft 8 disposed at the center of the mold cavity, and then vulcanized to form the columnar resilient roll body 10 integrally around the center shaft 8. The outer circumferential surface of the roll body 10 is smoothed or mirror-finished, according to the surface condition of the metal mold.

Various known resilient or elastic materials may be used for forming the resilient body, depending upon the specific application of the roll. When the roll is used as an electrostatically charging roll, for example, the resilient body is generally formed of an electrically conductive composition which is prepared by mixing a synthetic rubber such as SBR (styrene-butadiene rubber) or silicone rubber, with an electrically conductive powder or fiber such as a metallic powder, carbon black or carbon fiber. To assure good rolling contact of the charging roll with a photoconductive drum, for example, it is preferable to use a resilient material having a hardness (Hs) of about 20°—25° to form the roll body 10. The hardness of the resilient material can be easily lowered by addition of a large amount of softener.

Since the roll body 10 contains a large amount of softener as described just above, it is desirable to form an intermediate layer 32 on the outer surface of the roll body 10, for preventing the softener from migrating or bleeding out on the roll surface. The intermediate layer 32 has a thickness of several microns, and is formed of a material whose major component is a polymer containing nylon such as N-methoxymethylated nylon.

The above-indicated coating layer 30 is formed on the roll body 10 via the intermediate layer 32, by coating the outer circumferential surface of the roll body 10 with a suitable coating liquid, and drying the coating liquid. The coating layer 30 is advantageously formed by a roll coating method, using a coating apparatus as illustrated in FIG. 3, such that the thickness of the layer 30 is at its maximum at an axially middle point of the roll body 10, and is gradually reduced toward axially opposite ends of the body 10.

Figure 3:
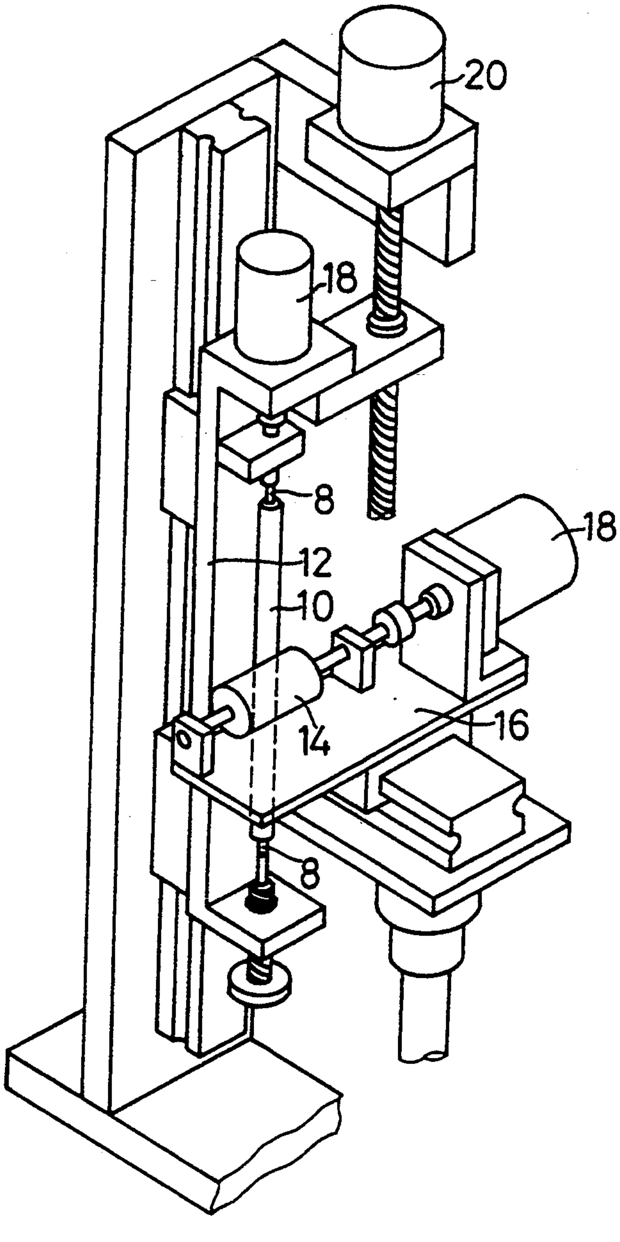
FIG. 3 is a perspective view showing one example of a coating apparatus used for producing the crowned resilient roll of the present invention.

The apparatus shown in FIG. 3 has a vertical slide 12 to which the center shaft 8 of the roll body 10 is attached such that the axis of the roll body 10 extends substantially in the vertical direction. The apparatus further has a coating roll 14, and a horizontal slide 16 to which the roll 14 is attached such that the axis of the roll 14 extends in the horizontal direction. The horizontal slide 16 is slidably moved toward the roll body 10 until the roll 14 comes into contact with the roll body 10, and is then fixed in this position. In this state, the roll body 10 and the coating roll 14 are rotated about their vertical and horizontal axes, by respective constant-speed motors 18, 18. In the meantime, the vertical slide 12 is moved or fed upwards as a variable-speed motor 20 rotates, so that the coating roll 14 and the roll body 10 are moved relative to each other in the vertical direction. The variable-speed motor 20 is provided with a rotation control system, which is adapted to control the rotating speed of the motor 20 depending upon the axial position of the roll body 10 relative to the coating roll 14.

The apparatus of FIG. 3 further includes a coating liquid supply device as shown in FIG. 4, which is located adjacent to the coating roll 14. The supply device includes: a supply tube 22 for supplying a coating liquid; a coating liquid regulating plate 24; a scraper 26; and a reservoir 28 for collecting the residual coating liquid. Initially, the coating liquid is fed at a suitable flow rate from the supply tube 22 onto the coating roll 14, and the amount of the liquid to be applied to the roll body 10 is adjusted by positioning the regulating plate 24 relative to the coating roll 14. After a portion of the coating liquid applied to the roll 14 is transferred to the outer surface of the roll body 10, the remaining amount of coating liquid is removed from the coating roll 14 by the scraper 26, and stored in the reservoir 28.

In the above roll-coating method, the coating roll 14 contacts with only a limited area of the outer circumferential surface of the roll body 10, at each infinitesimal length of time, as viewed in the axial and circumferential directions, and this area of contact of the rolls 10, 14 is continuously shifted in the axial and circumferential directions as the roll body 10 is rotated and moved upwards relative to the coating roll 14. In this manner, the roll body 10 moves in rolling contact with the coating roll 14, as a result of the contact point moving along a spiral line which extends from one axial end of the body 10 to the other axial end. Eventually, the entire surface area of the roll body 10 is brought into contact with the coating roll 14, and is thus coated with a spiral band of the coating liquid. In this connection, the roll body 10 may be moved downwards relative to the coating roll 14. Alternatively, the coating roll 14 instead of the roll body 10 may be moved upwards or downwards relative to the stationary roll body 10.

The rotating speeds of the roll body 10 and the coating roll 14, and the clearance between the coating roll 14 and the regulating plate 24 are kept at predetermined values. On the other hand, the speed of relative upward or downward movement of the coating roll 14 and the roll body 10 is controlled, such that the speed is continuously reduced as the contact area of the roll 14 and the roll body 10 is moved from one of the opposite axial ends of the roll body 10 toward the middle point thereof, and is continuously increased as the contact area is moved from the middle point of the body 10 toward the other axial end. In this manner, the amount of the coating liquid transferred from the coating roll 14 to the roll body 10 is regulated, so that the thickness of the coating layer 30 is at its maximum at an axially middle point of the roll body 10, and is gradually reduced to the minimum at its axially opposite ends. Thus, the crowned resilient roll with the coating layer 30 of continuously varying thickness is obtained.

Figure 6:
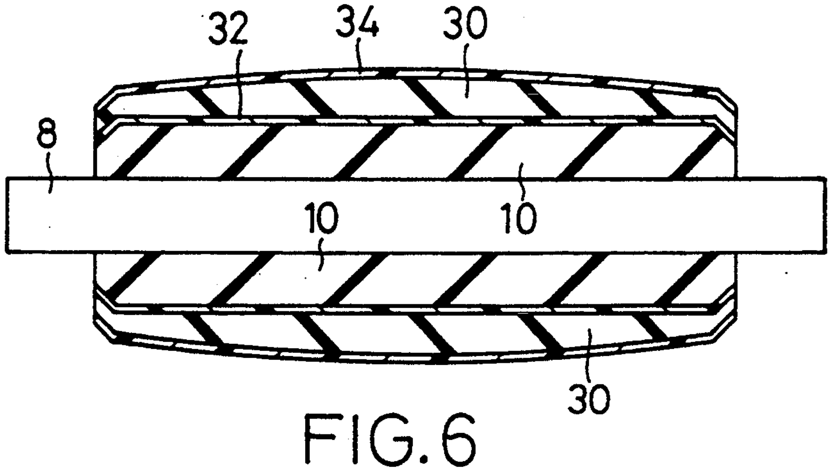
FIG. 6 is an axial cross sectional view showing another form of the crowned resilient roll of the present invention.
Figure 7:
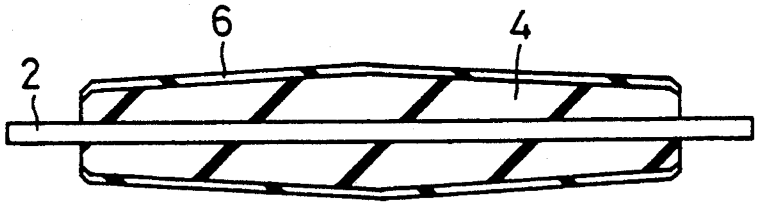
FIG. 7 PRIOR ART
FIG. 7 is an axial cross sectional view showing a known crowned resilient roll.

More specifically, the speed of relative movement of the roll body 10 and the coating roll 14 may be linearly reduced from "V1" to "V2" (V1>V2) as the contact area of the roll 14 and the roll body 10 moves from one axial end of the roll body 10 toward its middle point, and then linearly increased from "V2" to "V1" as the contact area moves from the middle point of the body 10 to the other axial end, as indicated by a solid line (A) in the graph of FIG. 5. Thus, the thickness of the coating layer 30 is varied at a constant rate, so as to provide the crowned resilient roll as shown in FIGS. 1 and 2. The amount of crown, namely, a difference between the minimum and maximum thickness values of the coating layer 30 of this resilient roll can be changed as desired, by changing the ratio V2/V1 of the above-indicated speed "V2" to the speed "V1". Namely, the thickness difference of the coating layer 30 is increased with a decrease in the ratio V2/V1. Alternatively, the speed of relative movement of the roll 14 and the roll body 10 may be non-linearly changed, as indicated by a one-dot chain line (B) in the graph of FIG. 5, so as to provide a resilient roll having a crowned shape as shown in FIG. 6. If the speed of relative movement of the body 10 and roll 14 is constant or fixed, as indicated by a broken line (C) in the graph of FIG. 5, the coating layer is formed with a uniform thickness on the roll body, whereby a non-crowned resilient roll having the same diameter over its entire length is obtained.

The speeds "V1", "V2" of relative movement of the roll body 10 and the coating roll 14 are selected depending upon the rotating speeds of the roll body 10 and coating roll 14, the clearance between the roll 14 and the regulating plate 24, and other factors. The speed "V1" which is determined so that a layer of the coating liquid applied in the form of a spiral band whose turns cover the roll body 10 is smoothed due to the gravity of the liquid before it is fully dried, and is given a uniform thickness. On the other hand, the above-indicated speed "V2" is determined so as to prevent an excessive overlapping of the individual turns of the spiral band of the coating liquid applied to the roll body 10, so that the turn of the spiral band previously formed on the roll body 10 is prevented from being partially removed due to the contact of the coating roll 14 during formation of the next turn. The speeds "V1", "V2" are also determined in relation to the viscosity of the coating liquid, so as to avoid drips and runs of the liquid of the spiral turns of the coating layer 30 while it is dried. The coating and drying steps are repeatedly effected with the speed of relative movement of the coating roll 14 and roll body 10 being held in the range of "V1" to "V2", so as to form the coating layer 30 in desired thicknesses.

The material for the coating layer 30 is selected from various known materials, depending upon the specific application of the resilient roll. In the case of a charging roll, for example, the coating layer 30 which serves as a resistance adjusting layer is formed of a semi-conductive resilient material, preferably, a rubber material containing epichlorohydrin. The coating layer 30 generally has a thickness ranging from about 50 μm to 500 μm, preferably, from 80 μm to 160 μm. On the surface of the thus formed coating layer 30, there may be formed as needed a protective layer 34 which is formed of a material whose major component is a polymer containing nylon such as N-methoxymethylated nylon. This protective layer 34 is formed in several microns of thickness, and serves to prevent the charging roll from sticking to a photoconductive drum, for example.

The crowned resilient roll thus obtained is held in good contact with a photoconductive drum, for example, since the axial middle portion of the roll has a larger diameter than the axially opposite end portions thereof. Therefore, the crowned roll is advantageously used as a charging roll, which does not suffer from poor charging. Further, there is no need to provide a cleaning member for removing the remaining toner from the charging roll, whereby the roll surface does not suffer from wearing due to its sliding contact with the cleaning member, assuring effectively improved durability of the charging roll.

Since the above-described process of producing the crowned roll does not include the conventional grinding step, the processing time can be significantly reduced with a result of increased production efficiency, permitting a larger number of rolls to be produced at a reduced cost. Further, the elimination of the grinding step solves the problems of deterioration of the surface condition due to grinding, sticking of grinding particle to the roll surface and others. Consequently, the present crowned roll is provided with a sufficiently smooth surface, which is achieved by forming the coating layer on a smooth surface of the roll body. The present resilient roll also ensures an excellent performance in operation, and is free from the conventionally required cleaning of its surface. Further, since the roll surface is sufficiently smooth, no classification of the individual rolls based on their surface conditions is required for their application.

It is to be understood that the present invention is applicable to various types of roll such as a developing roll, image transfer roll and fixing roll, other than the above-described charging roll. The materials for the roll body 10 and the coating layer 30 are suitably selected depending upon the application or use of the roll.

EXAMPLES

There will be described some examples of crowned resilient roll produced according to the present invention, in the form of charging rolls constructed as shown FIGS. 1 and 2. It is to be understood that the present invention is by no means limited to the details of the description of these examples, but may be embodied with various other changes, modifications and improvements, which may occur to those skilled in the art, without departing from the scope of the invention as defined in the appended claims.

Three examples (specimens) of charging roll were produced in the following manner. Initially, a metal mold having a cylindrical cavity was prepared, and a shaft 8 made of steel was disposed along the center line of the cylindrical mold cavity. Into the metal mold was introduced under pressure a rubber material which principally consists of an ethylene-propylene copolymer rubber mixed with an electrically conductive powder (carbon). Then, the rubber material was vulcanized within the mold according to an ordinary vulcanization method, to form a columnar roll body 10 (having an outer diameter of 12 mm) of each specimen of the charging roll, on the outer circumferential surface of the shaft 8. On the outer circumferential surface of the thus obtained roll body 10, there was formed an approximately 5 μm-thick intermediate layer 32 which principally consists of N-methoxymethylated nylon and which serves to prevent a softener from oozing or migrating out of the roll body 10.

Subsequently, the roll body 10 of each specimen of the charging roll was mounted on the coating apparatus as shown in FIGS. 3 and 4. The roll body 10 was rotated at a speed of 100 rpm, while the coating roll 14 (having an outer diameter of 30 mm) in abutting contact with the roll body 10 was rotated at a speed of 90 rpm. The clearance between the coating roll 14 and the coating liquid regulating plate 24 was set to 0.45 mm. A coating liquid having a viscosity of 3000 cps was prepared by dissolving in a suitable solvent a resilient material which consists principally of a copolymer rubber, epichlorohydrin, and ethylene oxide. With the coating liquid being fed to the coating roll 14, the vertical slide 12 was moved upwards so that the contact point between the roll body 10 and the coating roll 14 was shifted from the upper end of the roll body 10 to the lower end, to perform coating on the body 10.

Examples 1, 2 and 3 employed different coating conditions. More specifically explained, the speed of the relative movement of the roll body 10 and the coating roll 14 was varied as the roll body 10 was moved upwards. TABLE 1 indicates the speeds at three axial points of the roll body 10, i.e., the upper end (3 mm below the extreme upper end), the middle point (103 mm below the extreme upper end) and the lower end (203 mm below the extreme upper end). The above speed in each Example was linearly reduced (at a constant rate) as the roll body 10 was moved from its upper end to the middle point, and was linearly increased as the roll body 10 was moved from its middle point to the lower end. This coating operation (coating and drying steps) was repeated three times, so as to form the coating layer 30 having a nominal thickness of 160 μm or greater at its axial middle point. Further, a protective layer 34 (having a thickness of 10 μm) consisting principally of N-methoxymethylated nylon was formed on the surface of the coating layer 30, so as to provide an intended crowned resilient roll. To obtain a comparative example, the roll body 10 was moved from its upper end to its lower end, at a constant or fixed speed throughout the operating stroke, so that a coating layer having a uniform thickness was formed on the roll body 10.

TABLE 1

| Axial position | Speed of movement of roll body (mm/min) | | |
|---|---|---|---|
| of Roll body | Upper end | Middle point | Lower end |
| Example 1 | 480 | 420 | 480 |
| Example 2 | 550 | 350 | 550 |
| Example 3 | 800 | 300 | 800 |
| Comparative Example | 450 | 450 | 450 |

For each of the above examples of resilient rolls, the thickness values of the axially opposite ends and middle point of the coating layer, and the amounts of crown (the average difference in diameter between the middle point and axially opposite ends of the roll) were measured. At the same time, the roughness of the outer surface of each roll was measured to evaluate the surface condition (or dripping or running down of the coating liquid). The results of the evaluation are indicated in TABLE 2, wherein the marks "", "Δ" and "X" respectively represent "very good", "good" and "poor". Each of the obtained resilient rolls was pressed against a metallic roll of 30 mm in diameter, with a loading force of 500 gf applied to axially opposite end portions of the shaft of the roll, and the gap or clearance between the resilient roll and metallic roll when pressed against each other was measured by laser scanning. Further, each specimen of resilient roll was mounted on an actual copying machine, to evaluate the image producing durability of the roll. The results of the evaluation are also indicated in TABLE 2, wherein the marks "501 ", "Δ" and "X" respectively represent "very good", "good" and "poor".

TABLE 2

| | Thickness of Coating layer (μm) | | | Roll crown | Gap | Surface | Image producing |
|---|---|---|---|---|---|---|---|
| | Upper end | Middle point | Lower end | (μm) | (μm)*1 | condition | durability |
| Ex. 1 | 159 | 163 | 158 | 11 | 8 | O | Δ |
| Ex. 2 | 154 | 167 | 153 | 27 | −8 | O | O |
| Ex. 3 | 131 | 168 | 132 | 72 | −18 | Δ | O |
| Comp. Ex. | 161 | 155 | 152 | −9 | 14 | O | X |

*1: Clearance between resilient roll and metallic roll when pressed against each other It will be understood from the results as shown in TABLE 2 that the crowned resilient rolls of Examples Nos. 1–3, each formed with the coating layer 30 having the largest thickness at its middle point, had a gap or clearance of 10 μm or less with respect to the metallic roll against which each roll was pressed. In particular, the resilient rolls of Examples Nos. 2 and 3 were held in good contact with the metallic roll, with no gap left therebetween, assuring excellent image producing durability. It will be also understood that the crowned shape of the roll of the present invention is achieved by varying thickness of the coating layer 30. In comparison, the resilient roll of the comparative example showed poor image producing durability due to a relatively large gap between the roll and the metallic roll, which means a poor contact therebetween.

What is claimed is:

1. A crowned resilient roll whose diameter is continuously increased from axially opposite ends of the roll toward an axially middle point thereof, comprising:

a columnar roll body formed of a resilient material; and a coating layer formed on an outer circumferential surface of said roll body, said coating layer having a thickness which is varied in an axial direction of the roll body, such that the coating layer has the largest thickness at an axially middle point of the roll body, and such that the thickness is gradually reduced from said axially middle point toward axially opposite ends of the roll body.

2. A crowned resilient roll according to claim 1, wherein said roll body is formed of an electrically conductive resilient material, and said coating layer is formed of a semi-conductive resilient material to provide a resistance adjusting layer.

3. A crowned resilient roll according to claim 2, wherein said electrically conductive resilient material for said roll body is a mixture of a synthetic rubber and an electrically conductive powder or fiber.

4. A crowned resilient roll according to claim 2, wherein said semi-conductive resilient material for said coating layer is a rubber containing epichlorohydrin.

5. A crowned resilient roll according to claim 2, further comprising an intermediate layer disposed between said roll body and said coating layer, for preventing a softener from oozing out of the roll body.

6. A crowned resilient roll according to claim 5, wherein said intermediate layer is formed principally of a polymer containing N-methoxymethylated nylon.

7. A crowned resilient roll according to claim 2, further comprising a protective layer formed on an outer surface of said coating layer.

8. A crowned resilient roll according to claim 7, wherein said protective layer is formed principally of a polymer containing N-methoxymethylated nylon.

9. A crowned resilient roll according to claim 1, wherein the thickness of said coating layer is held in a range of 50 to 500 μm.

10. A crowned resilient roll according to claim 9, wherein the thickness of said coating layer is held in a range of 80 to 160 μm.

11. A crowned resilient roll according to claim 1, wherein said roll body has a hardness (Hs) of 20° to 25°.

12. A crowned resilient roll according to claim 1, wherein said columnar roll body has a substantially constant diameter over substantially the entire axial length thereof.

* * * * *